United States Patent [19]
Suzuki et al.

[11] Patent Number: 6,157,102
[45] Date of Patent: Dec. 5, 2000

[54] ARMATURE CORE AND BRUSH-EQUIPPED DC MOTOR USING THE SAME

[75] Inventors: Masao Suzuki; Shinichiro Hazama; Tokunari Nakamoto; Yoshihito Kondoh, all of Aichi-ken, Japan

[73] Assignee: Aisin Seiki Kabushiki Kaisha, Kariya, Japan

[21] Appl. No.: 09/391,157

[22] Filed: Sep. 8, 1999

[30] Foreign Application Priority Data

Sep. 8, 1998 [JP] Japan .................................. 10-253170
Feb. 22, 1999 [JP] Japan .................................. 11-043505

[51] Int. Cl.[7] .................................................. H02K 15/12
[52] U.S. Cl. ............................ 310/44; 310/216; 310/261
[58] Field of Search ............................ 310/44, 216, 239, 310/261, 264; 428/403, 329; 252/62.54

[56] References Cited

U.S. PATENT DOCUMENTS

| | | | |
|---|---|---|---|
| 3,758,799 | 9/1973 | Dochterman et al. .................. 310/89 |
| 4,256,326 | 3/1981 | Cantrell et al. ......................... 280/683 |
| 5,109,173 | 4/1992 | Someya et al. ......................... 310/261 |
| 5,238,507 | 8/1993 | Kugimiya et al. ...................... 148/307 |
| 5,350,558 | 9/1994 | Kawato et al. ........................... 419/35 |
| 5,352,522 | 10/1994 | Kugimiya et al. ...................... 428/403 |
| 5,536,985 | 7/1996 | Ward et al. ............................... 310/44 |
| 5,596,799 | 1/1997 | Beakes ...................................... 29/733 |
| 5,932,945 | 8/1999 | Volz et al. ................................. 310/89 |
| 5,973,138 | 10/1999 | Collis ..................................... 536/25.41 |

*Primary Examiner*—Nestor Ramirez
*Assistant Examiner*—Joseph Waks
*Attorney, Agent, or Firm*—Sughrue, Mion, Zinn Macpeak & Seas, PLLC

[57] ABSTRACT

An armature core includes a central circular portion and a plurality of equi-spaced extensions extending from the central circular portion outwardly in the radial direction. The extensions and the central circular portions are in the form of an integral configuration and are formed by hot pressing magnetic metal powder particles, each of which is covered by an insulating material.

14 Claims, 7 Drawing Sheets

ARMATURE CORE AND BRUSH-EQUIPPED DC MOTOR USING THE SAME

BACKGROUND OF THE INVENTION

The present invention is directed to an armature core and a brush-equipped DC motor using the same.

Figure 12:
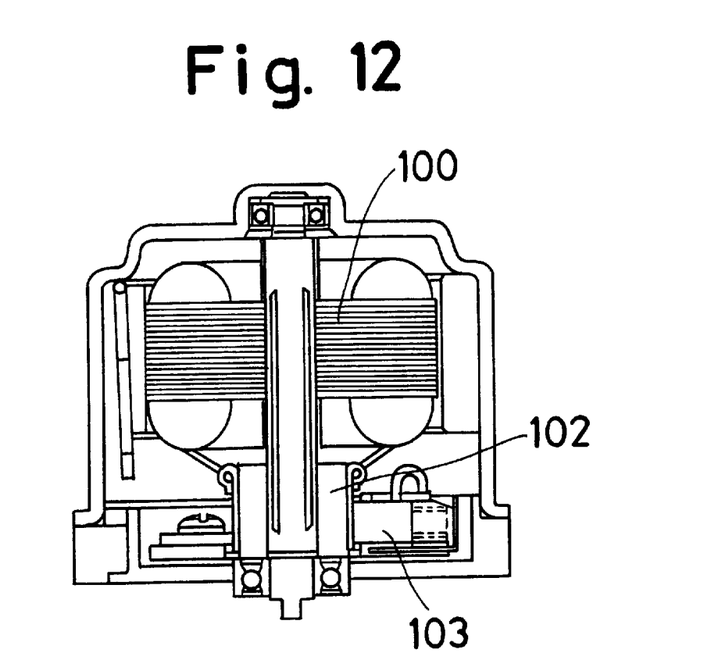
FIG. 12 is a cross-sectional view of a principal portion of a conventional brush-equipped DC motor showing one brush.
Figure 13:
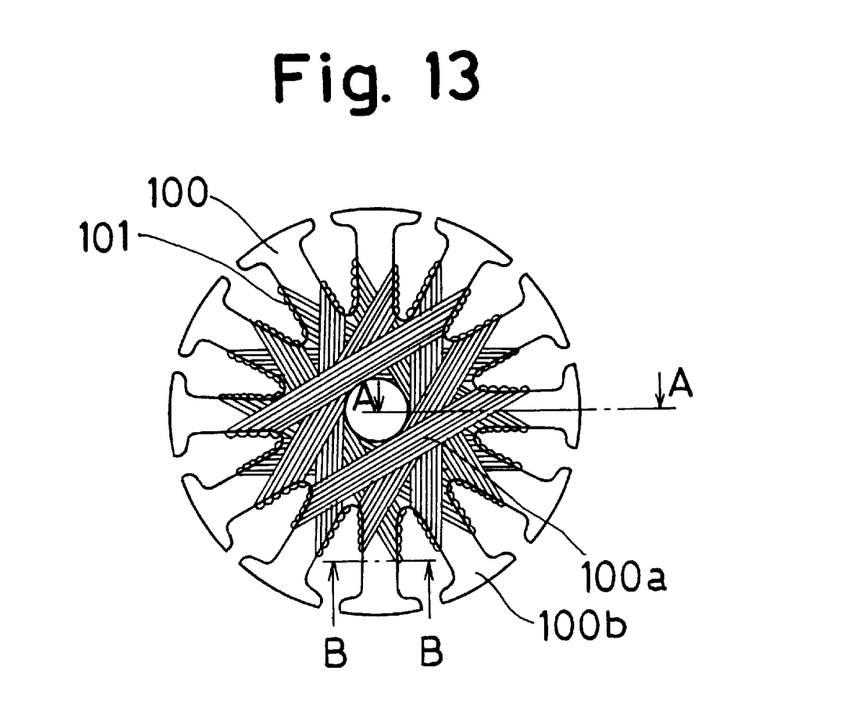
FIG. 13 is an axial view of armature portion of the conventional motor shown in FIG. 12.

As well known, a conventional brush-equipped DC motor includes, as shown in FIGS. 12 and 13, an armature core 100 having a wire coil 101 wound therearound, a commutator 102 electrically connected to the wire coil 101 and rotatable together with the core 100, a pair of brushes 103 which enable continuous rotation of the core 100 by providing current with different polarities alternately to the coil through the rotating commutator 102.

For reducing production cost and iron loss of the core 100, as can be understood from the illustration in FIG. 12, the core 100 is in the form of a plurality of layered thin steel sheets. The reason is that a cast core or a sintered core has a high electrical resistance whereby Eddy currents become large when a variable flux passes through the core 100, thereby heating the core which causes the iron loss of the core 100 to increase and therefore a drop of the output relative to the input is considerably decreased.

In view of the foregoing circumstances, the armature core 100 had to be formed from layered thin steel sheets. However, employing layered thin steel sheets restricts the shape design of the core. Thus, for example, the cross-sectional shape which is perpendicular to the axis of the core is difficult to change in a gradual manner in the axial direction.

In detail, as can be seen from FIG. 13, each of the layered thin steel sheets of the core has a central circular portion 100a and a plurality of equi-pitched radial extensions 100b. In light of the fact that the layered thin steel sheets are planar, the axial length L of any one of the extensions 100b is constant. In addition, the cross-section of the extension 100b in the axial direction of the core becomes rectangular with four right-angle corners as shown in FIG. 15.

Figure 14:
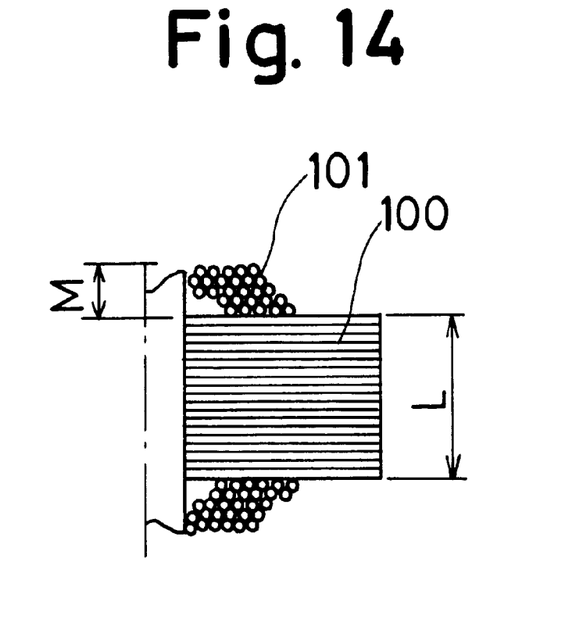
FIG. 14 is a cross-sectional view taken along line A—A in FIG. 13.

When winding the wire 101 around the core 100, the wire 101 is in an overlapped condition at the circular portion 100a and the resultant expansion, as shown in FIG. 14, has an axial dimension or thickness M, thereby enlarging the whole axial dimension of the core 100 by the thickness M.

Figure 15:
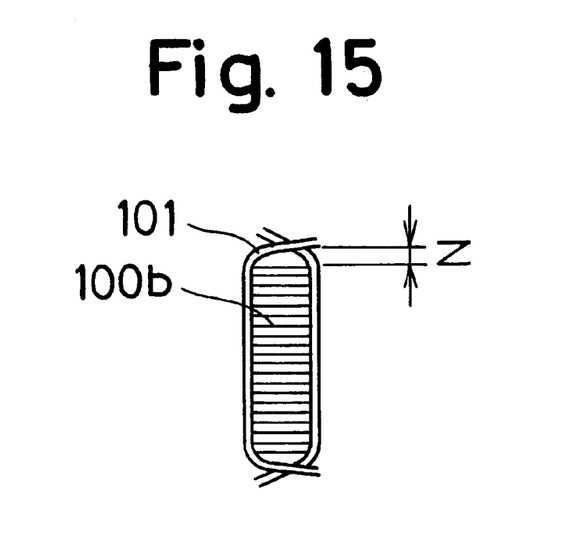
FIG. 15 is a cross-sectional view taken along line B—B in FIG. 13.

In addition, as can be understood from the illustration in FIG. 15, the right-angled corners of the core cause the winding coil 101 to be spaced from the core 100. Such a spacing causes an enlargement of the axial length of the core 100. Moreover, the axial length L of any one of the extensions 100b is constant as explained previously and thus it is difficult to place an element such as a bearing or commutator closed to the core 100 in the design thereof. This also causes an enlargement of the entire axial length of the core 100.

Furthermore, as can be appreciated from FIG. 15, the closed loop of the wire 101 forms a substantial oval, whereby the shortening of the wire 101 makes it difficult to achieve an adequate performance. Thus it is not possible to increase the motor output by increasing the current flowing through the wire when a voltage is applied across the motor when the closed loop is shortened in length.

The foregoing problems relate to the fact that the shape of the core cannot be formed in an arbitrary manner.

SUMMARY OF THE INVENTION

It is, therefore, a principal object of the present invention to provide an armature core whose shape can be formed in an arbitrary manner and a brush-equipped DC motor using the same.

In order to attain the foregoing objects, the present invention provides an armature core which comprises a central circular portion and a plurality of equi-spaced extensions extending from the central circular portion outwardly in the radial direction, the extensions and the central circular portions being in the form of an integral configuration and being formed by shaping magnetic metal powder particles, each of which is covered by an insulating material.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE PRESENT INVENTION

Preferred embodiments of the present invention will be described hereinafter in detail with reference to the accompanying drawings.

Figure 1:
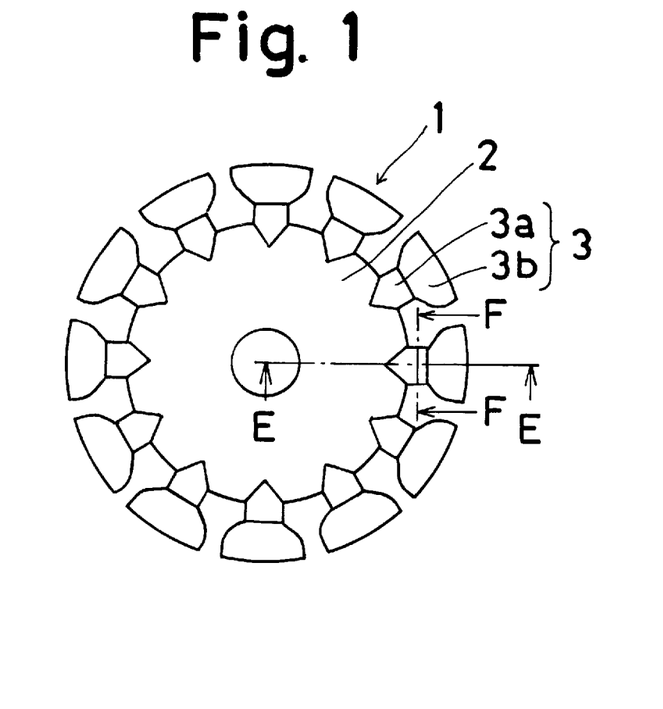
FIG. 1 is an axial view of an armature core in accordance with a first embodiment of the present invention.

With reference to the first embodiment shown in FIG. 1, there is illustrated an armature core 1. The armature core 1 includes a central circular portion 2 and a plurality of equi-spaced extensions 3 each of which extends outwardly in the radial direction. Each of the extensions 3 has a base portion 3a and a distal end portion 3b.

Figure 2:
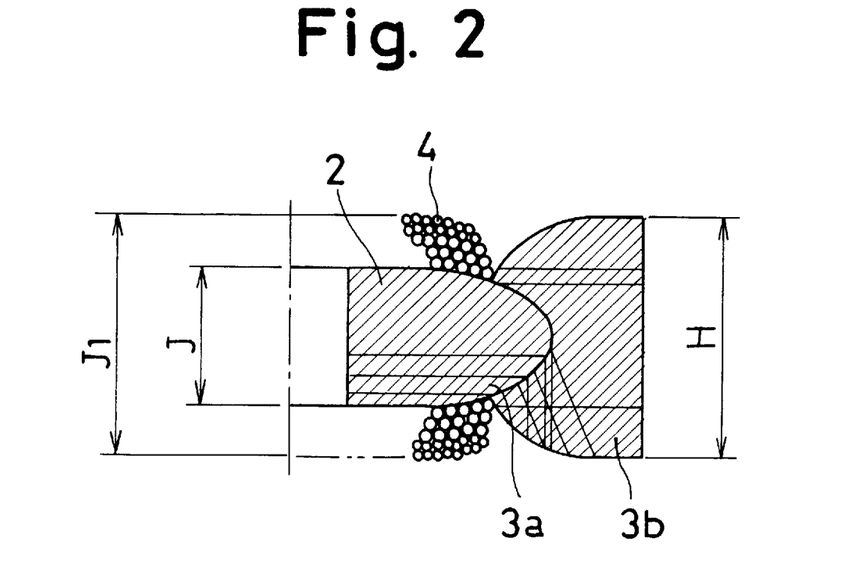
FIG. 2 is a cross-sectional view taken along line E—E in FIG. 1.

As best shown in FIG. 2, the thickness or axial dimension J of the circular portion J is set to be smaller than the thickness or axial dimension H of the distal end portion 3b of the extension 3. In addition, the base portion 3a of the extension 3 becomes gradually smaller in the radial direction and is smaller than the thickness H of the distal end portion 3b.

Figure 3:
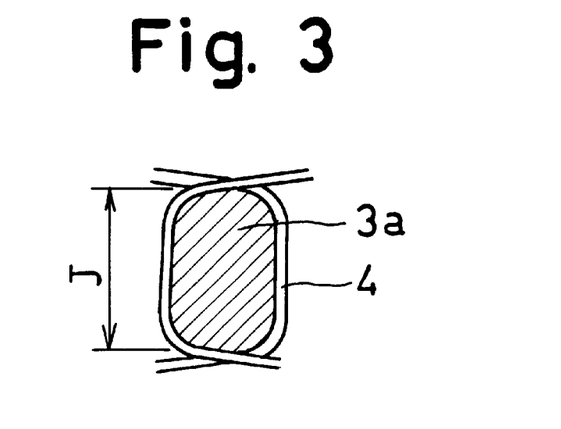
FIG. 3 is a cross-sectional view taken along line F—F in FIG. 1.

Referring to FIG. 3, each corner of the base portion 3a is formed into a rounded configuration and therefore when a wire 4 is wound around the base portion 3a, the wire 4 runs along the surface of the base portion 3a without defining a gap therebetween unlike the illustrated conventional condition in FIG. 15.

Since the core 1 has the foregoing configuration, after completion of winding the wire 4 the resultant wound or overlapped condition of the wire 4 as illustrated in FIG. 2 has a thickness J1 which is substantially equal to the thickness H of the distal end portion 3b. Thus, little protrusion of the wound wire 4 occurs.

Thus, by employing such a core 1 wherein the conventional protrusion M (FIG. 14) is deleted enables the construction of a motor having a shorter axial length, thereby providing a compact motor.

The core 1 is formed in accordance with the following steps. First of all, iron powder is prepared with each particle of the powder having a diameter ranging from 25 to 150 $\mu$m. Such particles are covered with a glass material for insulation. The resultant particles are input into a cavity with an amount of resin powder and are subjected to a hot press procedure (temperature: 275 degrees in Celsius) for 60 minutes. Upon completion of this procedure, the core 1 is configured to be the illustrated configuration shown in FIG. 1. It is to be noted that instead of iron-nickel, cobalt, and other magnetic materials whose characteristics vary upon being magnetized are available.

The resultant core 1 is formed of glass-insulated iron powder particles, which means that the electrical resistance thereof becomes larger as a whole. Thus, an Eddy current generated in the core 1 is smaller, thereby restricting the iron loss of the core 1 to a minimum.

Figure 4:
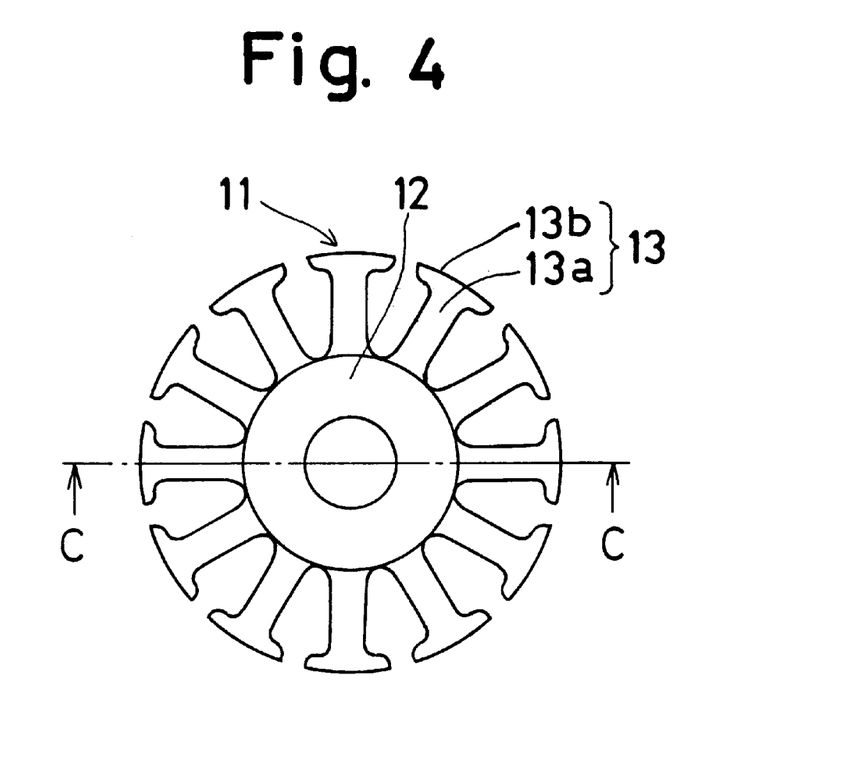
FIG. 4 is an axial view of an armature core in accordance with a second embodiment of the present invention.

Referring to the second embodiment shown in FIG. 4, there is illustrated an armature core 11 which is formed by a method similar to the method for forming the core 1 in accordance with the first embodiment of the present invention.

As shown in FIG. 4, the armature core 11 includes a central circular portion 12 and a plurality of equi-spaced extensions 13 each of which extends outwardly in the radial direction. Each of the extensions 13, has a base portion 13a and a distal end portion 13b. As is apparent from FIG. 5 and the following description, the circular portion 12 has a smaller thickness than the base 13a of the extension 13.

Figure 5:
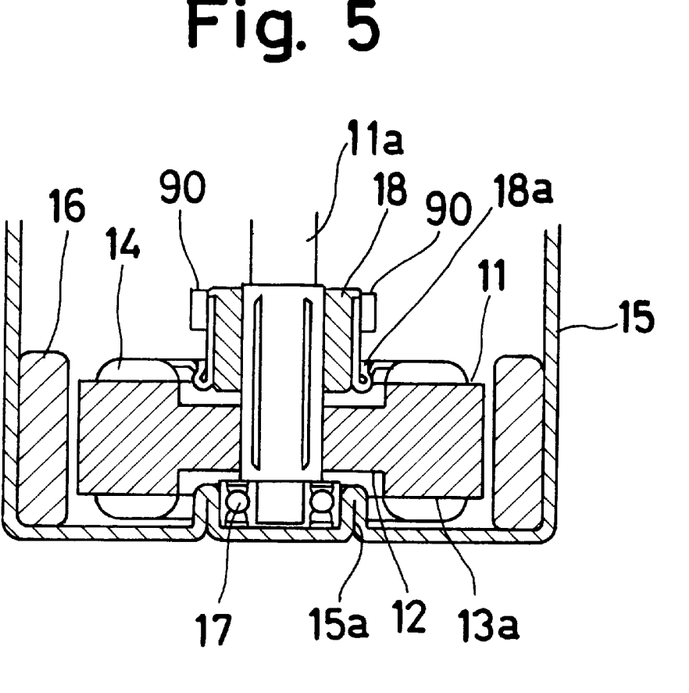
FIG. 5 is a cross-sectional view taken along line C—C in FIG. 4.

As illustrated in FIG. 5, a ring-shaped permanent magnet 16 is fixed on an inner surface of a motor casing 15. Within the permanent magnet 16, there is provided the core 11 upon which a wire 14 is wound thereon. The core 11 is rotatable relative to the motor casing 15 via a ball bearing 17. A commutator 18 is fixedly mounted on a shaft 11a and has a hooked portion 11a in electrical contact with ends of the wire 14 about the base 13a of the extension 13. An electrical connection is established via a pair of brushes 90 between the commutator and a power supply (not shown).

As can be appreciated from the illustration in FIG. 5, the axial length or thickness of the circular portion 12 is smaller than that of the extension 13, thereby forming a recess into which the hooked portion 18a of the commutator 18 extends. A corresponding recess is formed at the opposite side of the core 1 which partially accommodates the bearing 17 which is located in a space defined by a circular protuberance 15a in the bottom of the motor casing 15. Thus, the ball bearing 17 and the commutator 18 can be positioned close to the core 11, thereby shortening the entire axial length of the motor.

Figure 6:
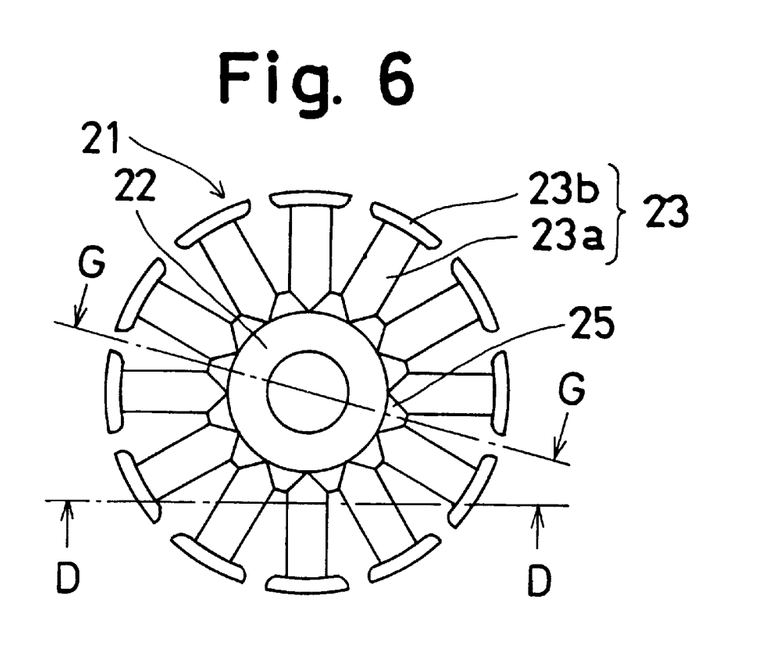
FIG. 6 is an axial view of an armature core in accordance with a third embodiment of the present invention.

With reference to the third embodiment shown in FIG. 6, the armature core 21 is formed by a method similar to the method of forming the core 1 in accordance with the first embodiment of the present invention.

As shown in FIG. 6, the armature core 21 includes a central circular portion 22 and a plurality of equi-spaced extensions 23 each of which extends outwardly in the radial direction. Each of the extensions 23, has a base portion 23a and a distal end portion 23b.

Figure 7:
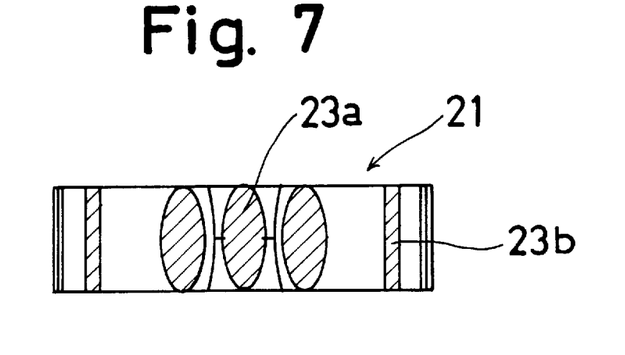
FIG. 7 is a cross-sectional view taken along line D—D in FIG. 6.
Figure 8:
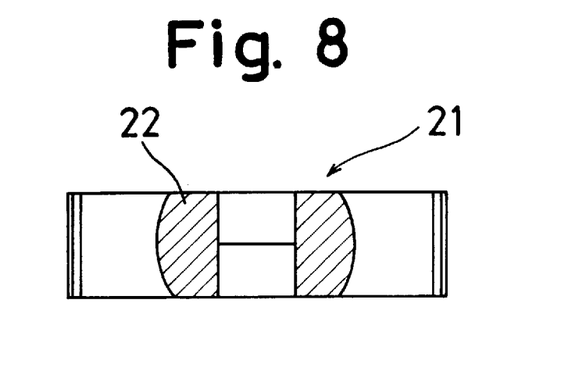
FIG. 8 is a cross-sectional view taken along line G—G in FIG. 6.

As can be seen from FIG. 7, the axial cross-section of the base portion 23a of the extension 23 is configured to be an ellipse. In addition, as shown in FIG. 6, a plurality of projections 25 is provided on an outer surface of the central circular portion 22 so as to extend along an axial direction thereof. As can be understood from the illustration in FIG. 8, the axial outer periphery of each projection 25 has a convex configuration. Such a structure enables shortening the length of the wire 24 in the form of the closed loop without reducing the magnetic flux area obtained by the structure in FIG. 13. Thus, a lower electrical resistance of the core can be established than that of the structure in FIG. 13, thereby increasing the output.

Figure 9:
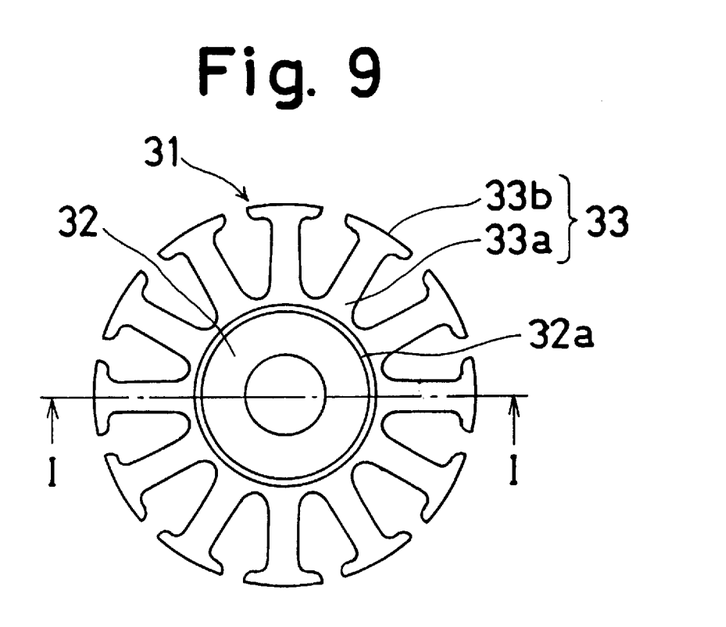
FIG. 9 is an axial view of an armature core in accordance with a fourth embodiment of the present invention.

With reference to the fourth embodiment shown in FIG. 9, the armature core 31 is formed by a method similar to the method for making the core 1 in accordance with the first embodiment of the present invention.

Figure 10:
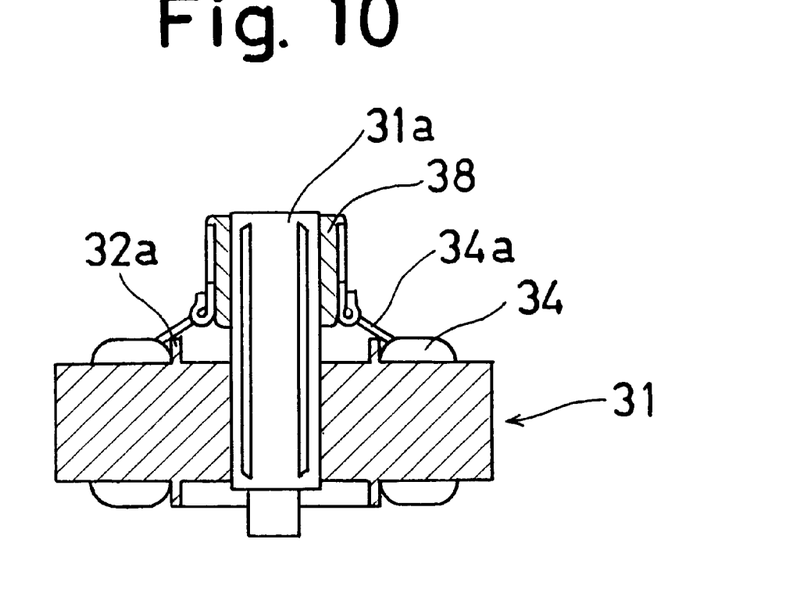
FIG. 10 is a cross-sectional view taken along line I—I in FIG. 9.
Figure 11:
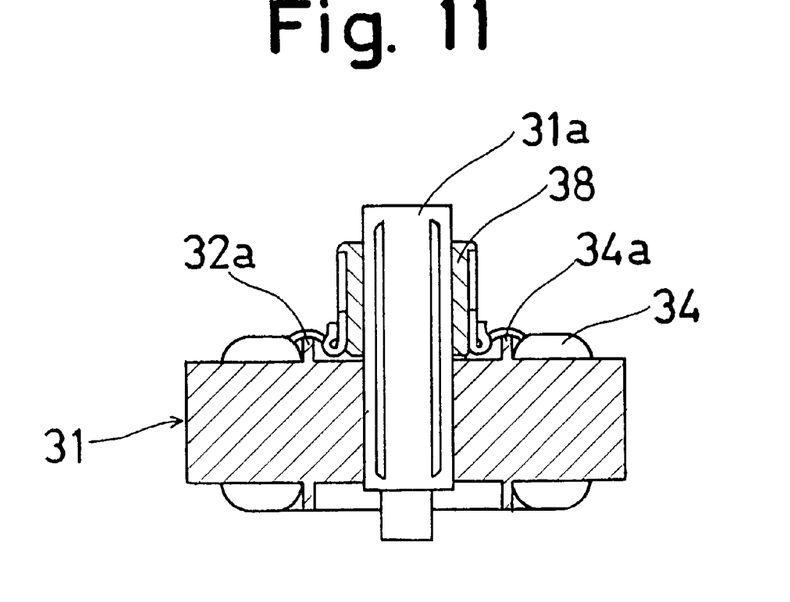
FIG. 11 is a variation of the structure shown in FIG. 10.

As illustrated in FIGS. 9 through 11, the armature core 31 includes a central circular portion 32 and a plurality of equi-spaced extensions 33 each of which extends outwardly in the radial direction. Each of the extensions 33 has a base portion 33a and a distal end portion 33b. The central circular portion 32 is also provided thereon with an integral axial cylindrical extension or annular ring 32 which acts as a partition. The axial length or extension degree of the annular ring 32 is set to be larger than that of wound wire coil 34. The distal end of the annular ring 32 is chamfered.

The illustration in FIG. 10 illustrates a condition wherein the shaft 31a of the core 31 is in the process of being fitted with a commutator 38 in press-fit manner. Upon completion of such a fitting, the condition in FIG. 11 is established wherein one end of the commutator 38 is within the annular ring 32a. Although a distal end 34a of the wire 34 slacks temporally during the change from FIG. 10 to FIG. 11, after the first engagement of the distal end 34a of the wire 34 with the chamfered end of the annular ring 32a, the resultant engagement remains unchanged with the application of adequate tension to the distal end 34a of the wire 34, which enables positioning of the commutator 38 close to the core 31. Thus, the overall axial length of the motor can be made smaller and no means are required such as providing varnish on the distal end 34a of the wire 34 for the prevention of slack thereof. In addition, chamfering the distal end of the annular ring 32a can distribute the stress generated at the distal end 34a of the wire 34 during the mounting of the commutator 38 on the shaft 31a, there by adjusting the tension of the wire 34 to a suitable value.

The invention has thus been shown and described with reference to specific embodiments, however, it should be understood that the invention is in no way limited to the details of the illustrated structures but changes and modifications may be made without departing from the scope of the appended claims.

What is claimed is:

1. An armature core comprising;
   a central circular portion; and
   a plurality of equi-spaced extensions extending from the central circular portion outwardly in a radial direction, the extensions and the central circular portions being in a form of an integral configuration and being formed by pressing magnetic metal powder particles each of said profiles being covered by an electrically insulating material.

2. An armature core as set forth in claim 1, wherein the central circular portion is smaller than a distal end portion of each of the extensions in an axial dimension.

3. An armature core as set forth in claim 2, wherein a base portion of each of said extension is smaller than the distal end portion of said each extension in said axial dimension.

4. An armature core as set forth in claim 1, wherein the central circular portion is smaller than a base portion of each of the extensions in an axial dimension.

5. An armature core as set forth in claim 1, wherein when a base portion of each of the extensions has an elliptical axial cross-section.

6. An armature core as set forth in claim 1, wherein a diameter of the central circular portion varies with an axial dimension of the central portion.

7. An armature core as set forth in claim 1, wherein the central circular portion is provided with an axial cylindrical ring extension.

8. A brush-equipped electric motor comprising a core, the core having a central circular portion and a plurality of equi-spaced extensions extending from the central circular portion outwardly in the radial direction, the extensions and the central circular portions being in a form of an integral configuration and being formed by pressing magnetic metal powder particles each of said particles being covered by an electrically insulating material.

9. A brush-equipped electric motor as set forth in claim 8, wherein the central circular portion is smaller than a distal end portion of each of the extensions in an axial dimension.

10. A brush-equipped electric motor as set forth in claim 9, wherein a base portion of each of said extension is smaller than a distal end portion of each extension in an axial dimension.

11. A brush-equipped electric motor as set forth in claim 8, wherein the central circular portion is smaller than a base portion of each of the extensions in an axial dimension.

12. A brush-equipped electric motor as set forth in claim 8, wherein a base portion of each of the extensions has an elliptical axial cross-section.

13. A brush-equipped electric motor as set forth in claim 8, wherein a diameter of the central circular portion varies with an axial dimension of the central portion.

14. A brush-equipped electric motor as set forth in claim 8, wherein the central circular portion is provided with an axial cylindrical ring extension.

* * * * *